United States Patent [19]

Gregory

[11] Patent Number: 4,611,502

[45] Date of Patent: Sep. 16, 1986

[54] THROTTLE CONTROL ASSEMBLY

[75] Inventor: Ted W. Gregory, Libertyville, Ill.

[73] Assignee: Arens Controls, Inc., Evanston, Ill.

[21] Appl. No.: 786,590

[22] Filed: Oct. 11, 1985

[51] Int. Cl.$^4$ ............................ F16C 1/10; G05G 5/06
[52] U.S. Cl. .......................................... 74/502; 74/527
[58] Field of Search ................... 74/502, 489, 501 A, 74/501 E, 501 F, 501 M, 501 R, 527; 116/283, 323, 324

[56] References Cited

U.S. PATENT DOCUMENTS

| 3,479,903 | 11/1969 | Hermanson et al. | 74/501 A |
|---|---|---|---|
| 3,835,726 | 9/1974 | Gregory | 74/501 A |
| 3,868,865 | 3/1975 | Neyer | 74/501 A |
| 4,438,658 | 3/1984 | Carlson | 74/501 A |

FOREIGN PATENT DOCUMENTS 2734109 2/1979 Fed. Rep. of Germany .... 74/501 R

Primary Examiner—William F. Pate, III
Assistant Examiner—John M. White
Attorney, Agent, or Firm—Tilton, Fallon, Lungmus

[57] ABSTRACT

A throttle control assembly for lawnmowers and similar power-operated equipment, such assembly consisting essentially of (1) a mounting member permanently affixed to the flexible casing for the throttle control wire and adapted to be secured to the handle of the power equipment, and (2) an elongated cover that may be easily connected to the end of the control wire and then snapped into operative position over the mounting member. When the parts are so coupled, the cover is readily slidable upon the mounting member (which it conceals and protects) to control engine speed but is securely locked against detachment from that mounting member. A speed indicator formed as an integral part of the mounting member projects through an elongated slot in the cover, and indicia upon the cover aligned with the indicator provide clear and accurate representations of throttle settings.

10 Claims, 7 Drawing Figures

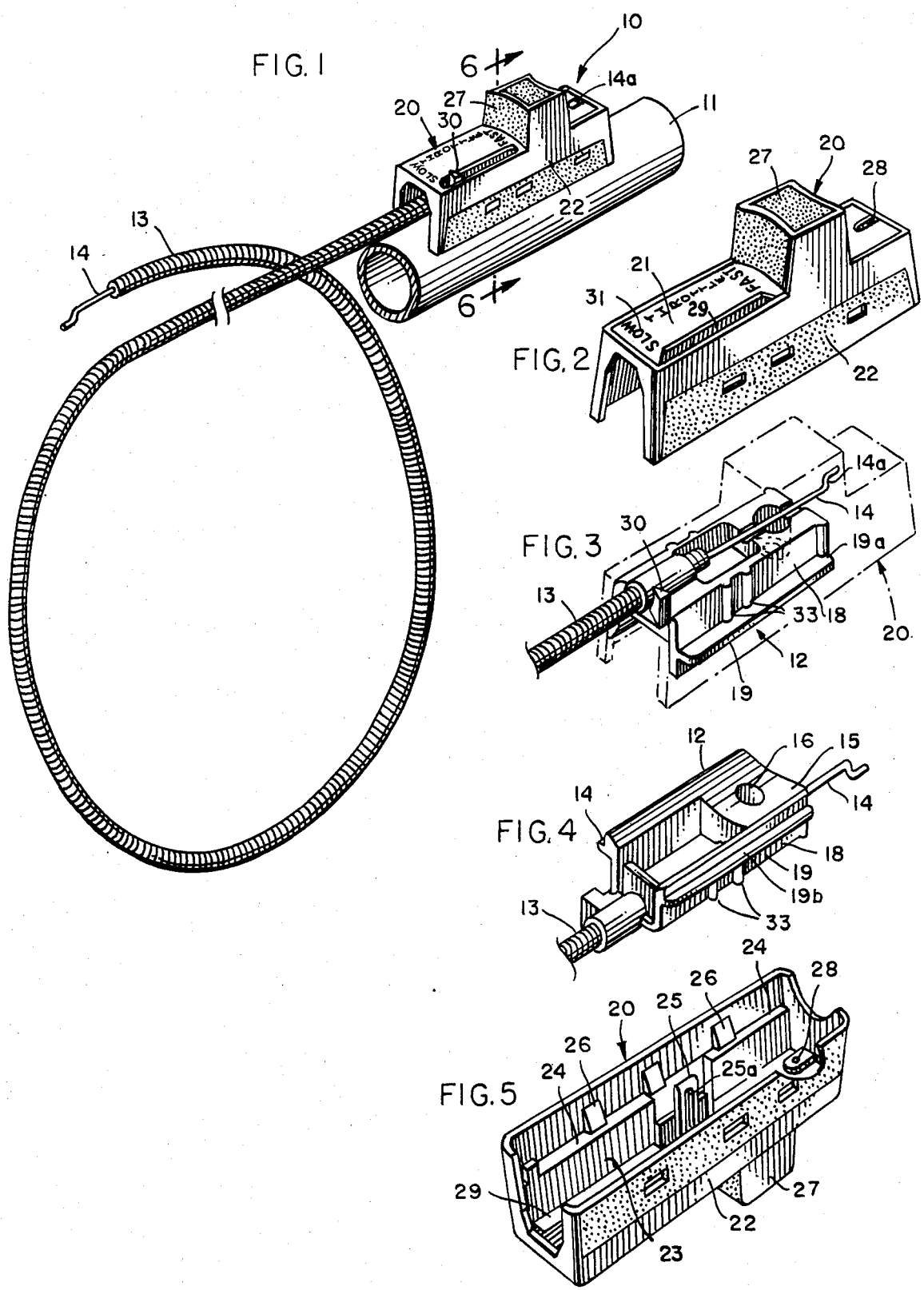

THROTTLE CONTROL ASSEMBLY

BACKGROUND AND SUMMARY

Various throttle controls for lawnmowers, snow blowers, and similar power-operated equipment have been known, but such controls generally fail to meet one or more of the requirements of simplicity, low cost, quality, durability, ease of assembly and attachment, dependability, safety, smoothness of operation, and precision in the adjustment of engine speed. Typical throttle controls may be of the pivotal lever type as represented, for example, in U.S. Pat. Nos. 3,868,865 and 4,170,151, or of the sliding knob type as disclosed in U.S. Pat. No. 3,835,726. This invention is concerned with a throttle control of the slide type.

An objective of this invention is to provide a throttle control which overcomes the shortcomings of prior (and existing) controls and does so without substantially increasing material and manufacturing costs. Specifically, it is an object to provide a control assembly that consists essentially of two main components that may be easily installed upon the handle of a lawnmower or other power equipment and is reliable, durable, and safe in operation. When the control assembly is so installed, throttle settings are clearly and precisely indicated, an increasingly important requirement for controls to be used with engines of newer design. The "knob" of the control is actually a cover with an enlarged projection that may be easily gripped for slidably shifting the cover throughout its range of movement. Large bearing surfaces insure effective operation and, since they are concealed and protected by the cover, the risks that such surfaces might become damaged or worn are greatly reduced. A spring detent, also concealed and protected by the cover, provides the user with a tactile indication of engine settings and prevents unintended changes from those settings.

In brief, the control assembly takes the form of a mounting member that may be either cast, molded, or stamped and is adapted to be rigidly secured by bolt, screw, or rivet to the handle of a lawnmower or other similar equipment. The mounting member is supplied permanently connected to one end of a flexible tubular casing that slidably receives a throttle control wire, the wire having its opposite ends projecting beyond the ends of the tubular casing. The second component, the plastic cover, is provided with a small aperture for attachment to the end of the wire adjacent the mounting member and, when so connected, the cover is then simply snapped into position over the mounting member to conceal that member and its attachment to the equipment handle.

The cover is elongated and may be slid longitudinally upon the mounting member to vary engine operating speed. An arrow-shaped indicator formed as part of the mounting member protrudes through a slot in the cover, and markings upon the large exposed surface of the cover along the slot provide a clear indication of throttle settings. A protruding knob or projection, formed integrally with the cover, facilitates manual adjustment of the throttle control.

The mounting member includes a pair of longitudinal ribs that project laterally from its opposite sides, such ribs providing smooth upper and lower surfaces for sliding engagement with the cover. The cover in turn has its longitudinal side walls internally provided with elongated downwardly-facing bearing surfaces that slidably engage the upper surfaces of the ribs of the mounting member. Because of the extended length of the respective bearing surfaces and the fact that they are concealed and protected by the cover, problems of wear are virtually eliminated.

The cover is retained upon the mounting member by a plurality of lugs or barbs that project inwardly from the side walls of the cover beneath the ribs of the mounting member. The limited flexibility of the material from which the cover is made, the shape and dimensions of the cover, and the sloping surfaces of the lugs or barbs, permit the side walls of the cover to flex outwardly to accommodate the mounting member as the parts are fitted together and, once the cover is fully in place, to snap back into position and prevent subsequent removal of the cover. The detent means for the control assembly takes the form of one or more spring arms that are molded as integral parts of the cover and engage projections formed along one or both sides of the mounting member.

Other features, objects, and advantages will become apparent from the specification and drawings.

DRAWINGS

FIG. 1 is a perspective view of a throttle control shown mounted upon the tubular section of an operating handle for a lawnmower or other similar power-operated equipment.

FIG. 2 is a perspective view of the cover prior to attachment to the mounting member.

FIG. 3 is a perspective view showing the mounting member prior to installation of the cover, the location of the cover when installed being indicated in phantom.

FIG. 4 is a perspective view showing the mounting member in inverted condition.

FIG. 5 is a perspective view of the cover in inverted condition.

DETAILED DESCRIPTION OF PREFERRED EMBODIMENT

Figure 6:
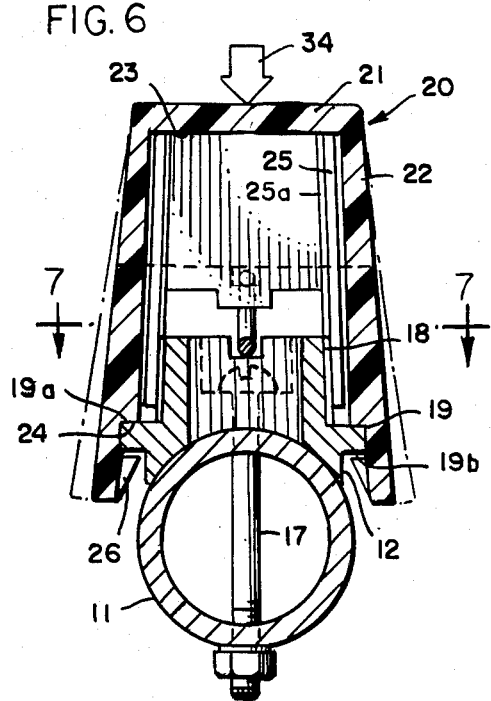
FIG. 6 is an enlarged sectional view taken along line 6—6 of FIG. 1 as well as line 6—6 of FIG. 7.

Referring to FIG. 1, the numeral 10 generally designates a throttle control assembly mounted upon the tubular handle 11 of a lawnmower, rotary tiller, snow thrower, or other similar power-operated equipment. The control assembly, as supplied to the user, dealer, or equipment manufacturer, consists essentially of two main parts. One part takes the form of a mounting member 12 to which is permanently connected one end of the flexible sheath or casing 13 for a throttle control wire 14 (FIGS. 3,4). While a Bowden wire casing is shown in the drawings, it is to be understood that the casing might instead consist of a flexible tube of nylon or other suitable plastic material.

The mounting member 12 is preferably formed of metal and is ideally made by a conventional insert die-casting procedure in which the mounting member is cast about the end of flexible casing 13. Alternatively, the mounting member 12 may be injection molded of any suitable rigid plastic and, again, formed or molded in place about the end of casing 13. In either case, mounting member 12 and casing 13 are permanently secured to each other during the manufacturing process.

As shown clearly in FIG. 4, the undersurface 15 of the mounting member is contoured to conform to the curvature of tubular handle member 11. An opening 16 extends through the member for receiving a bolt 17 for securely attaching the mounting member to tube 11, as shown clearly in FIG. 6. It is to be understood, of course, that other suitable fastening means, such as a screw or rivet, may be extended through the opening of the mounting member for the purpose of securing that member to tubular handle 11 or to some other part of the power-operated equipment.

FIGS. 3, 4, and 6 reveal that the mounting member 12 has a pair of generally parallel sides 18 from which a pair of longitudinal ribs 19 project. The ribs have smooth upper and lower bearing surfaces 19a and 19b, respectively.

Figure 7:
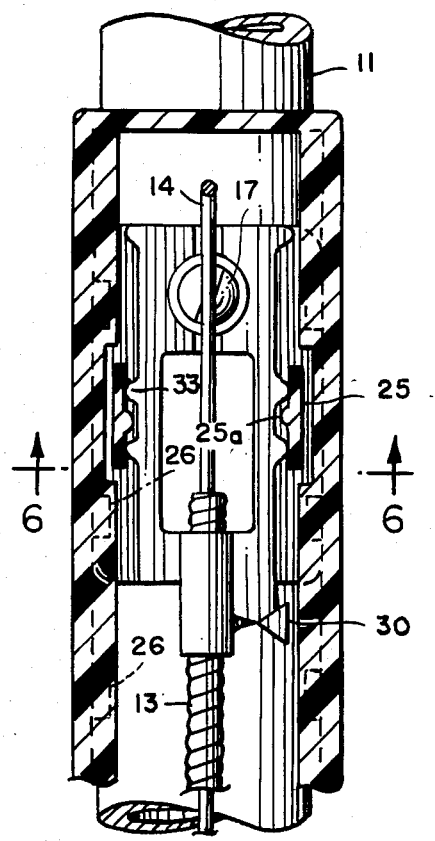
FIG. 7 is a longitudinal sectional view taken along line 7—7 of FIG. 6.

The other main part of the control assembly takes the form of a cover 20. As depicted in FIGS. 2 and 5, the cover is elongated and is provided with integral top and side walls 21 and 22 defining a downwardly-opening cavity 23 for receiving the mounting member 12. The cover has a length substantially greater than that of the mounting member, and its side walls are provided with elongated longitudinal bearing surfaces 24 that normally face downwardly and slidably engage the upwardly-facing surfaces 19a of ribs 19. The bearing surfaces or shoulders 24 extend substantially the full length of the cover except for an interruption in an intermediate area where a pair of spring fingers 25 are located (FIGS. 5, 6). Each finger is formed integrally with the cover and projects downwardly from the top wall 21 within cavity 23. As illustrated in FIGS. 5-7, each spring finger also has a vertical rib or ridge 25a that coacts with mounting member 12 to perform a detent function as will be explained more fully hereinafter.

Retention means in the form of integral tapered lugs or barbs project inwardly from the side walls 22 of the cover beneath bearing surfaces 24, with the upper surfaces of the lugs being spaced beneath bearing surfaces 24 to define channels for receiving the longitudinal ribs 19 of the mounting member 12.

While the cover may be provided with a variety of outer surface contours or shapes to suit the preferences of equipment manufacturers and users, it preferably has a knob portion 27 that projects upwardly from the upper surface 21 so that the cover may be easily gripped for forward and rearward sliding movement upon mounting member 12. At its remote end, the cover's top wall is provided with a small recessed opening 28 for receiving and retaining the Z-shaped portion 14a of the control wire 14 at its remote or distal end. An elongated slot 29 extends along the top wall at the opposite end of the cover and receives an upwardly-projecting triangular-shaped indicator 30 that is formed integrally with mounting member 12. Suitable indicia 31 imprinted, stamped, or formed upon the outer surface of top wall 21 along slot 29 inform the user of the operating position of slidable cover 20.

The entire cover, including spring fingers 25, barbs 26, and knob 27, may be molded from any strong, durable plastic material. High impact polystyrene has been found effective but other suitable plastic materials may be used. Also, if desired, the cover may be formed of metal. In any event, it is important that the cover be relatively rigid but that the side walls 22 be capable of slight outward flexing movement, as indicated by broken lines in FIG. 6, to permit the cover to be forced downwardly over ribs 19 with its side walls then springing back into the positions shown in solid lines to lock the cover 20 and mounting member 12 against unintentional separation.

The mounting member 12 may be provided with a plurality of vertical ridges 33 along its side surfaces 18 to serve as detents for engagement with the ribs 25a of spring fingers 25 (FIGS. 3, 7). Such ribs or ridges not only provide tactile input to the user with regard to throttle adjustment, but also prevent unintended changes in throttle position because of engine vibration and the like.

As already indicated, the assembly is supplied to the user in the form of two major components, one being mounting member 12 and its attached cable assembly and the other being cover 20. To mount the throttle assembly, the user, dealer, or equipment manufacturer simply bolts or otherwise secures the mounting member 12 to tubular handle 11 or to some other appropriate portion of the equipment. After connecting the operating end of the control wire to the carburetor, the installer inserts the Z-shaped end 14a of the wire through opening 28 in the cover and then snaps the cover downwardly over mounting member 12 in the direction indicated by arrow 34 in FIG. 6.

The terms "downwardly" and "upwardly" are used in this specification because FIGS. 1 and 6 depict the usual orientation of the throttle control when it is properly installed. It is conceivable, however, that a mounting might be selected in which the entire assembly faces laterally or even downwardly. Regardless of its orientation, however, the cover 20, as it is shifted forwardly and rearwardly to adjust engine speed, also tends to be urged towards the mounting member in the general direction represented by arrow 34. Despite the application of such forces, damage to the parts is avoided and wear is minimized because of the relatively large inter-engaging bearing surfaces 24 of the cover and 19a of the mounting member.

While in the foregoing I have disclosed an embodiment of the invention in considerable detail for purposes of illustration, it will be understood by those skilled in the art that many of these details may be varied without departing from the spirit and scope of the invention.

I claim:

1. A throttle control assembly for lawnmowers and other power-operated equipment, comprising a throttle control wire slidably carried in a flexible tubular casing with its ends projecting beyond the ends of said casing; a mounting member secured to one of said ends of said casing and having an undersurface adapted to be affixed to said equipment; said mounting member having generally parallel sides and a pair of longitudinal ribs projecting laterally from said sides with smooth, elongated, upper surfaces; and an elongated cover having integral top and side walls defining a downwardly-opening cavity for receiving said mounting member; said cover being substantially longer than said mounting member and said side walls thereof providing elongated downwardly-facing bearing surfaces within said cavity for slidably engaging the upper surfaces of said ribs; retention means formed integrally with said side walls of said cover for retaining said cover upon said mounting member; means provided by said cover for securing the same to a portion of said wire projecting from the end of said casing secured to said mounting member; and a knob provided by said cover to facilitate manually sliding said cover longitudinally into selected operating positions relative to said mounting member.

2. The assembly of claim 1 in which said knob is integrally formed with said cover.

3. The assembly of claim 2 in which said knob extends upwardly from the top wall of said cover.

4. The assembly of claim 1 in which said means for securing said cover to said wire comprises an opening formed in said cover to receive and retain said end of said wire.

5. The assembly of claim 1 in which said retention means comprises a plurality of integral barbs spaced below said downwardly-facing bearing surfaces of said cover for retaining said ribs between said bearing surfaces and said barbs.

6. The assembly of claim 1 in which said mounting member is formed of metal and is insert diecast about said one end of said casing.

7. The assembly of claim 1 in which said top wall of said cover is provided with a longitudinal slit; said mounting member having indicator means projecting upwardly through said slit for indicating the setting of said cover in relation to said mounting member.

8. The assembly of claim 7 in which said top wall is provided with indicia adjacent said slit for relating the position of said indicator to engine speed.

9. The assembly of claim 1 in which said cover also includes at least one integrally-formed spring finger extending from said top wall alongside said mounting member; and detent means provided by said mounting member at selected positions along the length thereof for engaging said spring finger.

10. The assembly of claim 9 in which a pair of said spring fingers extend from said top wall along opposite sides of said mounting member above said ribs; said detent means comprising ridges projecting laterally from opposite sides of said mounting member for engagement with said fingers.

* * * * *